Patented Apr. 13, 1937

2,076,921

UNITED STATES PATENT OFFICE 2,076,921

AZO DYESTUFFS

Hans Schindhelm and Max Schubert, Frankfort-on-the-Main-Fechenheim, Germany, assignors to General Aniline Works, Inc., New York, N. Y., a corporation of Delaware No Drawing. Application February 6, 1935, Serial No. 5,303. In Germany February 15, 1934

4 Claims. (Cl. 260—44.2)

Our invention relates to azodyestuffs, which are direct cotton dyestuffs, more particularly to azodyestuffs corresponding to the general formula:

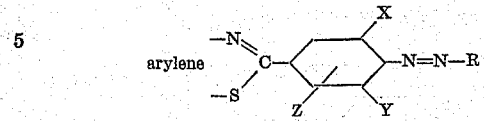

wherein "arylene" stands for a radicle of the group consisting of the benzene and naphthalene series, X stands for one of the group consisting of halogen and methoxy, Y for one of the group consisting of hydrogen and halogen, Z for one of the group consisting of hydrogen and a sulfonic acid group and R means the radicle of a coupling component. The new dyestuffs dye the vegetable fibers bluish red to blue to violet shades.

In consequence of the presence of the group signified above by X in ortho-position to the azo-group the present dyestuffs are capable of forming either in substance or on the fiber copper compounds which are characterized by an excellent fastness to light. They are obtained by combining the diazocompounds of the corresponding aminophenylthiazolic compounds with suitable combining components.

The aforesaid amino-compounds are obtainable for instance in the following manner:

A 4-nitro-3-halogen- or 4-nitro-3-alkoxy-aryl-carboxylic acid chloride is condensed with an amino-aryl-ortho-mercaptan and the nitroaryl-arylene-thiazole formed is reduced to the corresponding amino-compound. Into both compounds—the amino- and also the nitro-compound—further substituents may be introduced, such as the sulphonic acid group. Particularly valuable diazo components are those containing in both ortho-positions to the amino-group halogen atoms or in the one a halogen atom and in the other a sulphonic acid group.

In order to further illustrate our invention the following examples are given; but we wish it, however, to be understood that our invention is not limited to the particular products or reaction conditions stated therein.

Example 1

The diazo compound of 372 parts of the sodium salt of 2-(4'-amino-3'-methoxyphenyl)-6-methyl-benzthiazole sulphonic acid, prepared by condensing 4-nitro-3-methoxy-benzoylchloride with 4-amino-3-mercaptotoluene with a subsequent reduction and sulphonation, is combined at about 0° C. in the presence of sodium carbonate with 350 parts of the sodium salt of 2-phenylamino-5-naphthol-7-sulphonic acid. The dyestuff formed of the formula:

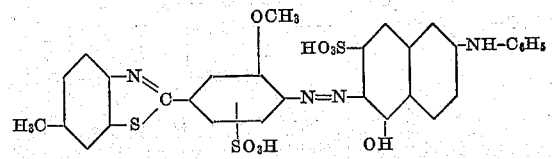

is when dry a powder of metallic lustre dissolving in water with a reddish violet, in concentrated sulphuric acid with a blue color and dyeing cotton bright reddish violet shades which turn to a bright bluish violet of substantially improved fastness to light by converting the dyestuff into the copper compound.

Example 2

When replacing in the foregoing example the solution of the 2-phenylamino-5-naphthol-7-sulfonic acid by a solution of 380 parts of the sodium salt of 2-benzoylamino-5-naphthol-7-sulfonic acid in 320 parts of sodium carbonate and about 5000 parts of water a dyestuff is obtained which is when dry a dark powder soluble in concentrated sulfuric acid with a greenish blue color and in water with a red color. It dyes cotton clear bluish red shades turning to a purplelike bluish red of a particular fastness to light when aftertreated with a copper compound.

Example 3

When combining the diazo-compound mentioned in Example 1 at about 0° C. with a solution of 260 parts of the urea of the 2-amino-5-naphthol-7-sulfonic acid in 320 parts of sodium carbonate and about 5000 parts of water the dyestuff formation is completed in some hours. The isolated dyestuff of the formula:

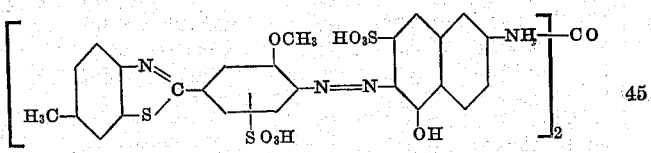

is a dark powder soluble in water with a reddish violet and in concentrated sulfuric acid with a greenish blue color. It dyes cotton strong bluish red shades, which become more bluish and fast to light by conversion into the copper compound.

When using the diazocompound of the corresponding ethoxy-dehydro-thiotoluidinsulfonic acid a similar dyestuff is obtained the copper compound of which is identical with that of the above dyestuff.

Similar dyestuffs are obtained when starting from the diazocompound of sulfonic acids of 2-(4'-amino-3'-ethoxy)-6,7-benzo- or -4-methyl-6-chloro-benzthiazole.

*Example 4*

309 parts of 2-(3',5'-dichloro-4'-aminophenyl)-6-methyl-benzthiazol are dissolved in 600 parts of sulfuric acid of 66° Bé. and about 10,000 parts of ice are added. Then the diazotization is carried out by means of a solution of 70 parts of sodium nitrite in about 400 parts of water at 5 to 10° C. The diazo-compound is isolated as a paste and at 0° C. added to a solution of 360 parts of the sodium salt of 2-naphthol-3,6-disulfonic acid in sodium carbonate. The formed monoazodyestuff of the formula:

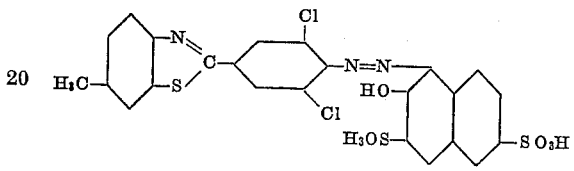

is poured as a paste into a caustic soda solution prepared from 3700 parts of water and 480 parts of caustic soda, 200 parts of glycerin and 440 parts of copper sulfate, dissolved in little water are added and the mixture is kept while stirring for some hours at 85–90° C. After neutralization with hydrochloric acid the copper containing dyestuff is isolated. It is when dry a dark powder of metallic lustre, soluble in water and concentrated sulfuric acid with a violet color. It dyes cotton violet shades of a very good fastness to light.

Similar dyestuffs, fast to light are obtained by replacing the 2-naphthol-3,6-disulfonic acid for instance by 1-naphthol-3,6-disulfonic acid or 8-chloro-1-naphthol-3,6-disulfonic acid.

*Example 5*

When combining in the same manner the diazocompound of 355 parts of 2-(3'-chloro-4'-aminophenyl)-6-m e t h y l-benzothiazole-5'-sulfonic acid with a solution, containing sodium carbonate and 350 parts of the sodium salt of the 2-phenylamino-5-hydroxynaphthalene-7-sulfonic acid, the formed dyestuff of the formula:

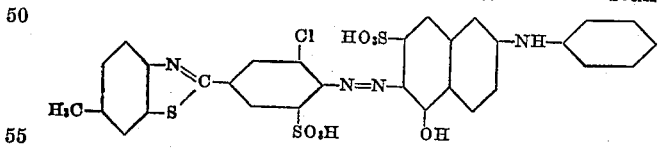

is converted as described in the foregoing example into its copper compound, which is when dry a dark powder, soluble in water with a violet and in concentrated sulfuric acid with a bluish color. It dyes cotton fast violet shades.

When combining the same quantity of the same diazo-compound with 520 parts of the sodium salt of 5,5'-dihydroxy-2,2'-dinaphthylamine-7,7'-disulfonic acid and treating the formed monoazodyestuff with a solution of copper hydroxide in caustic potash a copper containing dyestuff is obtained which is when dry a dark powder soluble in water with a reddish blue and in concentrated sulfuric acid with a blue color. It dyes cotton fast reddish blue shades.

Similar dyestuffs are obtained when using the diazo-compound of sulfonic acids of 2-(4'-amino-3'-chlorophenyl)-4,5-benzo- or -4-methoxybenzothiazole.

We claim:
1. Azodyestuffs of the general formula:

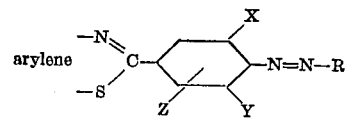

wherein "arylene" stands for a radicle of the group consisting of the benzene and naphthalene series, X stands for one of the group consisting of halogen and methoxy, Y for one of the group consisting of hydrogen and halogen, Z for one of the group consisting of hydrogen and a sulfonic acid group and R means the radicle of a coupling component, which dyestuffs dye the vegetable fibers bluish red to blue to violet shades and form copper compounds of an excellent fastness to light.

2. The azodyestuff of the formula:

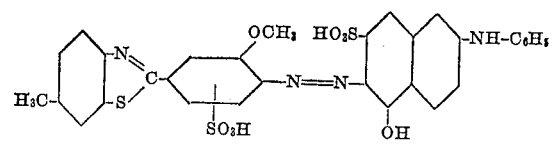

which dyestuff is when dry a powder of metallic lustre dissolving in water with a reddish violet, in concentrated sulfuric acid with a blue color and dyeing cotton bright reddish violet shades which turn to a bright bluish violet of substantially improved fastness to light by converting the dyestuff into the copper compound.

3. The azodyestuff of the formula:

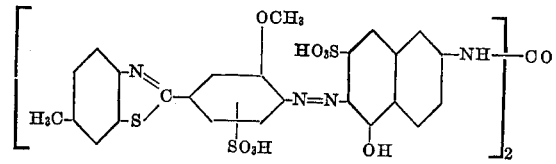

which dyestuff is when dry a dark powder soluble in water with a reddish violet and in concentrated sulfuric acid with a greenish blue color, which dyestuff dyes cotton strong bluish red shades which turn to more bluish shades of improved fastness to light by converting the dyestuff into the copper compound.

4. The azodyestuff of the formula:

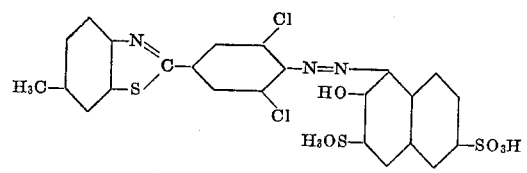

which dyestuff is in the form of its copper compound when dry a dark powder of metallic lustre, soluble in water and concentrated sulfuric acid with a violet color and dyes cotton violet shades of a very good fastness to light.

HANS SCHINDHELM.
MAX SCHUBERT.